United States Patent [19]

Naka et al.

[11] 4,429,000
[45] Jan. 31, 1984

[54] MOISTURE-PERMEABLE WATERPROOF COATED FABRIC AND METHOD OF MAKING THE SAME

[75] Inventors: Yasushi Naka, Hirakata; Kiyoshi Kawakami, Kyoto, both of Japan

[73] Assignee: Toray Industries, Inc., Japan

[21] Appl. No.: 286,615

[22] Filed: Jul. 24, 1981

Related U.S. Application Data

[63] Continuation of Ser. No. 102,410, Dec. 11, 1979, abandoned.

[51] Int. Cl.³ .............................................. B32B 27/40
[52] U.S. Cl. .................................. 428/265; 428/266; 428/267; 428/286; 428/290; 428/314.2; 428/315.5; 428/315.9; 428/316.6; 428/423.5; 428/423.7; 428/424.8; 427/246

[58] Field of Search ............... 428/262, 265, 266, 267, 428/286, 290, 423.5, 423.7, 424.8, 314.2, 315.5, 315.9, 316.6; 427/246; 521/62, 86, 137

[56] References Cited

U.S. PATENT DOCUMENTS 3,360,394  12/1967  Griffin ................................... 428/262
4,137,360   1/1979  Reischl ................................. 428/310

*Primary Examiner*—Marion McCamish
*Attorney, Agent, or Firm*—Scully, Scott, Murphy & Presser

[57] ABSTRACT

A moisture-permeable waterproof coated fabric having a microporous polyurethane layer is obtained by the so-called wet coagulation method using as a coated solution a polar organic solvent solution containing 8 to 25% by weight of a polyurethane elastomer, 0.1 to 10% by weight of a water repellent agent, 0.2 to 3% by weight of polyisocyanate and 1 to 8% by weight of a nonionic surfactant.

12 Claims, 4 Drawing Figures

← 5μ

← 5μ

MOISTURE-PERMEABLE WATERPROOF COATED FABRIC AND METHOD OF MAKING THE SAME

This is a continuation of parent application U.S. Ser. No. 102,410, filed Dec. 11, 1979 for Yasushi Naka, et al., now abandoned.

FIELD OF THE INVENTION

This invention relates to a moisture-permeable waterproof coated fabric. More particularly, it is concerned with a moisture-permeable waterproof coated fabric of a drape handling having an excellent moisture permeability, a moderate air permeability and a durable waterproofness, and method of making same.

BACKGROUND OF THE INVENTION

Various waterproof coated fabrics have heretofore been made public; for example, waterproof fabrics coated with a natural or synthetic rubber are practically used for raincoats and other waterproof clothing, tents, tarpaulins and other products. But all of them are less moisture permeable; for example, such a waterproof clothing as raincoat gives an unpleasant feeling in wear due to stuffiness, while in the case of tents or the like there condenses vapor in the interior thereof in their practical use. On the other hand, as a waterproof fabric emphasizing moisture permeability there is a fabric having high woven density with a mere water repellent treatment applied thereto, but its water entry pressure is insufficient, about 100 mmH$_2$O/cm$^2$ at the highest, because it is almost decided by the woven construction and yarn density of the fabric used, and when the durability of water repellency is taken into account, its water-proofness is only temporary, for which reasons such fabric is inappropriate as a practical waterproof fabric.

As a coated fabric having air- and moisture permeability, moreover, there is a fabric coated with a microporous polyurethane layer or a fabric coated with a porous layer obtained by using a synthetic resin with various blowing agents or the like added. The former is produced for example by the so-called wet coagulation method in which a polar organic solvent solution of a polyurethane is applied to a base fabric and then the latter is immersed in water bath to form a microporous polyurethane layer thereon. According to this method, it is easy to form a layer having many fine pores, so air- and moisture permeability can be imparted easily, but it is difficult to attain a necessary and sufficient water-proofness. As an example of method of making the latter, mention may be made of the method in which a solution of a synthetic polymer containing a blowing agent is applied to a base fabric and then the blowing agent is allowed to foam by heating or some other means to thereby form a porous layer of the synthetic polymer. According to this method, however, the pores thereby formed are spherical or elliptic, large in diameter and consist predominantly of independent pores, so it is difficult to attain a sufficient air- and moisture permeability though water-proofness is obtained.

OBJECT OF THE INVENTION

It is the object of this invention to provide a coated fabric which remedies the above-mentioned drawbacks and which has superior moisture permeability and water-proofness.

DETAILED DESCRIPTION OF THE INVENTION

According to this invention, in the so-called wet coagulation method wherein a micrporous polyurethane layer is formed on a base fabric, there is used as a coating solution a polar organic solvent solution containing 8 to 25% by weight of a polyurethane elastomer, 0.1 to 10% by weight of a water repellent agent which, with respect to a polyisocyanate used, is stable at a temperature not higher than 40° C. and can react at a temperature not lower than 100° C., 0.2 to 3% by weight of the polyisocyanate and 1 to 8% by weight of a nonionic surfactant, whereby the fine pores present within a microporous polyurethane layer formed by wet coagulation of the said coating solution are adjusted in diameter to not larger than 5 microns and at the same time a durable water repellency is imparted to the surfaces of such fine pores. In this way, a coated fabric having superior moisture permeability and water proofness is obtained.

The term "fabric" as used herein means a general term for fabricated materials including woven fabric, knitted fabric, non-woven fabric and the like.

As water repellent agent to be incorporated into the coating solution of the invention, there may be used any water repellent agent if only, with respect to a polyisocyanate used, it is stable at a low temperature, e.g. not higher than 40° C., and can react at a high temperature, e.g. not lower than 100° C. When such a water repellent agent is used together with polyisocyanates, it is made possible to impart a durable water repellency not only to the surface of a microporous polyurethane layer formed by the wet coagulation method, but also to the surfaces of many fine pores, namely inner wall portions of the pores, present within the said layer. If a water repellent agent used reacts at a low temperature with a polyisocyanate used, the coating solution which contain them becomes gelled and unemployable. In contrast therewith, if the two react at a high temperature, the bonding property between the water repellent agent and the microporous polyurethane layer (including the surfaces of fine pores present within the said layer) is enhanced and an excellent, durable water-proofness can thereby be attained. In general, fluorine- and silicone-based water repellent agents available commercially are preferable. For example, dimethylpolysiloxane, methylhydrogenpolysiloxane,

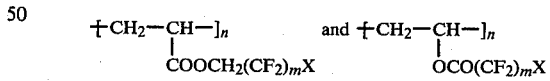

(x is H or F, m is an integer of 1–20 and n is a degree of polymerization) are exemplified. Among all, fluorine-based water repellent agents are more effective. It is also effective to use both fluorine- and silicone-based water repellent agents.

If the content of a water repellent agent is smaller than 0.1% by weight, a sufficient water repellency will not be obtained, while a content thereof larger than 10.0% by weight tends to make non-uniform the size of pores present within a microporous layer formed by wet coagulation. In the case of fluorine-based water repellent agent, it is preferable that the mixing ratio thereof in a treating bath be in the range of from 0.1 to 1.0% by weight, and this range is preferred for making the pores uniform.

By way of illustrating the polyisocyanate to be used together with a water repellent agent, mention may be made of an organic compound having two or more isocyanate groups such as di- or triisocyanate. For example, it may be selected optionally from diisocyanates such as 2,4-(2,6-)tolylene diisocyanate diphenylmethane 4,4'-diisocyanate, 1,4-naphthalene diisocyanate, isophorone diisocyanate, and hexamethylene diisocyanate, and triisocyanates resulting from the addition reaction of 3 moles of these diisocyanates and 1 mole of active hydrogen-containing compounds such as trimethylolpropane and glycerin. These polyisocyanates may have their isocyanate groups in a free form or in a stabilized form with added phenol, etc.

The simultaneous use of polyisocyanate is effective in enhancing the bonding property of a water repellent agent to a microporous polyurethane layer and imparting durability to the water repellency as referred to previously, and also effective in improving the crease-flex-resistance of the microporous layer. If the content of a polyisocyanate is lower than 0.2% by weight, the polyisocyanate will not exhibit its function and effect to a satisfactory extent, resulting in the durability of the water repellency and the crease-flex-resistance of the microporous layer becoming insufficient. On the other hand, with a higher content thereof than 3.0% by weight, the handling or the feeling of the resulting coated fabric becomes coarse and hard though the bonding effect is remarkable.

As a nonionic surfactant to be used in this invention there may be used any nonionic surfactants available commercially, but especially a nonionic surfactant consisting of a block copolymer of polypropylene glycol and polyethylene glycol affords good results.

The use of such a nonionic surfactant in this invention is effective in enhancing the compatibility of the foregoing water repellent agent and polyisocyanates and, if any, pigments and other additives, with the polyurethane solution, and also effective in adjusting, when the polyurethane solution is immersed in coagulating bath, the disolving speed of the solvent in the polyurethane solution into the coagulating bath, as well as the permeating and diffusing speed of water in the coagulating bath into the polymer solution, resulting in that not only the pores present within the formed microporous layer are made uniform and fine, but also the bulk of the water repellent agent can be concentrated uniformly on the pore surfaces and the partition wall surface between pores. If the content of a nonionic surfactant is lower than 1% by weight, the function and effect of the surfactant will be unsatisfactory, while with a higher content thereof than 8% by weight, the pores present within the resulting microporous layer tend to become coarse; besides, the water repellent agent used tends to flow into the coagulating bath without staying on the pore surfaces.

The viscosity of the aforesaid coating solution used in this invention is not specially limited, but an extremely low viscosity thereof would make it difficult to suppress the permeation of the said solution into a base fabric even if a pre-treatment is applied; therefore, such viscosity should be taken into account together with the method of pre-treatment.

In this invention, as will be apparent from the foregoing description, a polyurethane elastomer solution is used as a coating solution which contains a water repellent agent, a polyisocyanate and a nonionic surfactant in the respective amounts within predetermined ranges to allow these components to exhibit a synergistic effect whereby a large number of fine pores present within a microporous layer formed by wet coagulation are adjusted to 5 microns or less in diameter and a durable water repellency is imparted even to the surfaces of such pores, and thus a coated fabric having an excellent durable water-proofness and a high moisture permeability can be obtained easily.

Therefore, it goes without saying that a commonly used means in the so-called wet coagulation method may be adopted optionally as long as it does not impede the function and effect of the above-mentioned components of the coating solution. But it is desirable that the concentration of polyurethane elastomer in the coating solution be in the range of from 8 to 25% by weight. In more particular terms, as a polyurethane elastomer to be used as a coating solution there may be used a polyester type polyurethane elastomer or a polyether type polyurethane elastomer, but in the formation of a microporous polyurethane layer according to the wet coagulation method there generally exists a correlation between the concentration of polyurethane elastomer and the diameter of pores present within the microporous layer; that is, as the said concentration becomes lower the pore diameter tends to become larger, while as it becomes higher the pores show a tendency to a smaller diameter. In this invention, such tendencies are mitigated by the function and effect of a nonionic surfactant contained in the coating solution, but if the concentration of polyurethane elastomer is lower than 8% by weight, it is difficult to adjust the pores within the microporous layer to not larger than 5 microns in diameter, while if the concentration thereof is higher than 25% by weight the moisture permeability, one of the objects of the invention, is difficult to attain and the handling of the resulting coated fabric becomes rubber-like, though very fine pores can be formed. A polar organic solvent to be used in this invention is not specially limited. Dimethylformamide, dimethylacetamide, dimethylsulfoxide are exemplified.

A coagulating bath to be used in this invention is not specially limited, but it is advantageous to use an aqueous solution containing 5 to 20% by weight of a polar organic solvent such as dimethylformamide.

The foregoing coating solution is applied uniformly in a desired thickness using a knife-over-roll coater or other conventional coating machine.

In this invention, the foregoing polar organic solvent solution as a coating solution containing polyurethane may be directly applied to at least one face of a base fabric followed by application of a coagulation treatment, but it is desirable to apply a pre-treatment with a view to improving the moisture permeability, the handling of the resulting coated fabric and the bonding property between the microporous layer and the base fabric. In such a pre-treatment process, it is desirable in point of handling and moisture permeability that polyurethane be allowed to permeate in the direction of the thickness of the base fabric and up to about one-third of the same thickness, but a further permeation not allowed.

To be concrete, the face of a base fabric to which is to be applied a polyurethane solution is heated and pressurized by calendering or some other suitable means to allow fibers to be transformed in section so as to become more narrowly spaced from each other, or a silicone- or fluorine-based water repellent agent may be applied to the base fabric. By applying such treating means to a base fabric as necessary, not only the permeation of a polyurethane solution into the base fabric can be suppressed but also the bonding between the fibers constituting the base fabric and the synthetic polymer is relaxed when applying the said polymer solution to the base fabric, so that there is obtained a coated fabric of a drape handling having superior moisture- and air permeability and a high peeling strength. In this case, if the polyurethane solution permeates in the direction of the thickness of the base fabric more than one-third of the said thickness, moisture permeability, tearing strength and other physical properties and drapeness are lowered.

As a water repellent agent to be used in the aforesaid pre-treating process, the use of a conventional silicone-based repellent agent affords almost the same function and effect as in the use of a fluorine-based water repellent agent, but would result in decrease in the peeling strength between polymer layer and base fabric and the durability being insufficient, so the use of a fluorine-based water repellent agent is preferred. The amount of a fluorine-based water repellent agent to be adhered to a base fabric is desirably in the range of from 0.03 to 1.0% by weight though it is connected with the viscosity of the polymer solution used in the following step. Outside this range, for example in the case of the adhesion amount being smaller than 0.03% by weight, the permeation of the polyurethane solution into a base fabric will become less suppressible and consequently the resulting coated fabric is deteriorated in drapeness of its handling and in moisture permeability. On the other hand, with an adhesion amount larger than 1.0% by weight, the effect of the treatment in question is remarkable and the resulting coated fabric has a very drape handling and an excellent moisture permeability, but the peeling strength and durability are poor.

If to the base fabric thus subjected to the water repellent treatment is further incorporated not more than 100% by weight, based on the weight of the base fabric, of water or a mixed solution of water and a polar organic solvent and thereafter the foregoing application process is carried out, the resulting function and effect are remarkable as compared with the only water repellent treatment case and particularly the peeling strength is improved to a large extent, though the mechanism of action is not fully known.

In this invention, moreover, it is desirable to include the following step in the pre-treatment in order to improve the moisture permeability and water-proofness and to remedy the drawback incidental to a coated fabric that it is coarse and hard and is less durable. Such additional step just referred to above is a step wherein to the surface of a base fabric to which is to be applied to polyurethane is applied a synthetic polymer of a different composition from the polyurethane, especially a synthetic polymer having a bonding function, in dotted or intermittently linear form. That is, before applying a polyurethane coating solution to a base fabric, a polymer of a different composition from the polyurethane is applied to the base fabric in dotted form or intermittently, thereafter a polar organic solvent solution consisting essentially of polyurethane is applied to the base fabric and then the latter is immersed in a coagulating bath to form a microporous polyurethane layer having moisture permeability. Applying such a synthetic polymer in dotted form or intermittently is advantageous in that the permeation of polyurethane into a base fabric can be easily suppressed to one-third or less of the thickness of the base fabric and in that the moisture permeability and handling are less damaged since the said synthetic polymer is applied in dotted or intermittent form. Furthermore, since the moisture-permeable microporous layer consisting essentially of polyurethane and the base fabric are bonded together through the medium of the synthetic polymer applied in dotted or intermittent form, the peeling strength can be remarkably improved without spoilage of handling of the fabric. The thickness of a base fabric as referred to herein means a substantial thickness of the base fabric, which is measured with a thickness meter except naps and fluffs if any.

In this invention, to apply synthetic polymer of a different composition from polyurethane there may be used a known method such as a dotted coating roller or spray system. On the other hand, for applying such synthetic polymer in an intermittent manner there may be adopted various arranging methods, for example, a parallely arranged form of plural linear matters, a crossed arrangement of plural linear matters in the form of a rhomb or checkers, or a piled arrangement of linear matters in the form of a meandering or spiral.

As a synthetic polymer to be applied in dotted or intermittent form to a base fabric, there may be employed any known synthetic polymers if only they have an adhesive force and per se are insoluble or difficult to dissolve in polar organic solvents, or become insoluble or difficult to dissolve in polar organic solvents in combination thereof with an adhesive (cross-linking agent). Acrylic polymers are typical examples of such synthetic polymer. It is desirable that such synthetic polymer be applied to a base fabric in an area of 20 to 80% of the surface of the base fabric. If the applied area is smaller than 20%, the effect of suppressing the permeation of the polyurethane solution into a base fabric is poor, and the effect of enhancing the peeling strength between the formed microporous layer and the base fabric is also poor. On the other hand, with an applied area exceeding 80%, the effect of suppressing the permeation of the polyurethane solution into a base substrate is outstanding and the peeling strength is enhanced to a remarkable extent, but the moisture permeability of the resulting coated fabric is lowered to a large extent and the handling thereof becomes coarse and hard.

In this invention, the peeling strength referred to above can be changed freely by adjusting and selecting the kind, applied amount and applied spacing of such synthetic polymer. It is desirable that the peeling strength be as high as possible, but the range of the peeling strength is limited of itself in balance with the drapeness of handling and moisture permeability. Peeling strengths lower than 100 g/cm are not preferred, because with such values the coated fabrics concerned are of no utility and the moisture permeable layer comes off soon in ordinary use. In this invention, therefore, a base fabric is treated so that the peeling strength is not lower than 100 g/cm, preferably not lower than 200 g/cm. It goes without saying that the aforesaid processing step may be carried out in combination with the foregoing pre-treatment.

By way of illustrating base fabrics used in this invention, mention may be made of woven, knitted and nonwoven fabrics, and the fibers constituting those fabrics may be any of natural fibers such as cotton, silk and wool, chemical fabrics such as cellulose, viscose rayon and cupra, and synthetic fibers such as polyamide, polyester and polyacrylic synthetic fibers; furthermore, they may be filament yarn, spun yarn, blended spun yarn, or mixed fabric thereof. In the case of a fabric made of staple fibers, however, it is desirable that, before or intermediate of the treatment of the invention, fluffs be decreased by calendering, fluff singeing, or like means.

In this invention, a base fabric which has been subjected to the foregoing coagulation treatment may be further subjected to another water repellent treatment. This additional step is not essential, but may be applied as necessary whereby a pore permanent water repellency can be imparted to the surface of the formed microporous layer.

As the water repellent agent used in the invention, ther may be employed any conventional water repellent agents, including fluorine- and silicone-based ones. The amount of water repellent agent adhered to a base fabric may vary according to the use, but generally it is in the range of from 0.5 to 2.0% by weight.

The fabric which has been treated as herein defined may be further subjected to known treatments as necessary such as curing, tentering and softening.

Any fabrics from thin to vuluminous ones can be treated according to this invention. Furthermore, fabric in multilayered form is also employable.

An example of method of making a coated fabric according to this invention has been described above, and in this connection we have found that in the wet coagulation method using the same polyurethane elastomer, even if the composition of the treating bath is somewhat changed, there is obtained a coated fabric having the same performance. In more particular terms, there is used a coating solution prepared by adding and mixing a metal complex of the formula shown below into a polyurethane elastomer and dissolving and dispersing the mixture in a polar organic solvent such as dimethylformamide. The content of the metal complex is preferably 1 to 10% by weight. Of course, to this coating solution there may be added and mixed as necessary a water repellent agent such as a silicone- or fluorine-based water repellent agent, a nonionic surfactant, or diisocyanate, or further an inorganic particulate matter. Also, it goes without saying that the foregoing pre- and after-treatment steps may be applied as necessary to a base fabric:

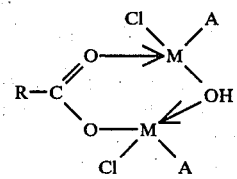

wherein R is a hydrocarbon radical having 8 or more carbon atoms, M is Cr or Al, and A is Cl or OH. Preferable R is an alkyl radical having 8 to 20 carbon atoms such as decyl, hexadecyl, octadecyl.

The following description is now provided about the structure and characteristic of a coated fabric obtained according to this invention. The coated fabric is represented as a moisture-permeable waterproof coated fabric having on at least one face thereof a microporous layer of a synthetic polymer consisting essentially of polyurethane, characterized by having a water entry pressure not lower than 700 mmH$_2$O/cm$^2$, a moisture permeability not lower than 2500 g/m$^2$.24 hrs, preferably not lower than 5000 g/m$^2$.24 hrs, and an air permeability (measured by the Gurley method) not higher than 600 sec/100 cc.

The moisture-permeable waterproof coated fabric of this invention is further characterized in that the crease-flex-resistance of the microporous layer formed of the foregoing synthetic polymer is 200 times/1 kg load or higher, the impregnation degree of the said layer into a base fabric is one-third or less of the thickness of the base fabric, and the peeling strength is 100 g/cm or higher.

According to this invention, moreover, an outstanding effect is exhibited by the structure that the microporous layer formed of a synthetic polymer consisting essentially of polyurethane has a multitude of fine pores in its surface and relatively large cavity portions communicating with the said fine pores are formed inside the layer, and further a communication hole is formed at least in part of the partition wall between adjacent said cavity portions. An outstanding effect is attained particularly when the diameter of the surface fine pores is not larger than 5 microns, preferably not larger than 3 microns and more preferably not larger than 1 micron, and the diameter of the cavity portion is at least three times the diameter of the fine pores.

DRAWINGS

Some embodiments of the invention will be described by way of example with reference to the accompanying drawings. In said drawings.

Figure 1:
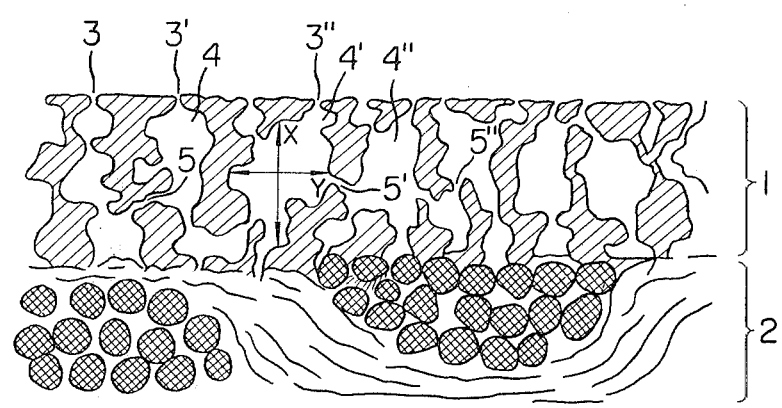
FIG. 1 is an enlarged sectional view of a coated layer formed according to this invention.

A microporous layer 1 is formed on the surface of a base fabric 2, while inside the microporous layer are formed a multitude of cavity portions 4, 4', 4" having very small inside diameters. On the other hand, in the microporous layer 1 are formed a large number of fine pores 3, 3', 3" most of which are not larger than 5 microns in diameter and among which there exist many whose diameters are not larger than 1 micron. An actual measurement for the product made according to a working example of the invention showed that the diameters of the fine pores were distributed from 0.1 to 3.0 microns and that fine pores of 0.1 to 1.0 microns occupied a considerable proportion. Most of these fine pores communicate with the cavity portions 4, 4', 4" formed inside the microporous layer, the diameters of the void portions of the said cavity portions being at least three times the diameters of the fine pores, and consequently the so-called bottle shape is formed, which structure has never been thought of heretofore. It is preferable that an average diameter of the void portion be usually 50 microns and especially up to about 30 microns. In the cavity portion 4' shown in FIG. 1, the X and Y of the void portion were measured to find that X was 20 microns and Y 12 microns.

In this invention, moreover, one or more fine holes 5, 5', 5" are formed in part or the whole of the partition wall between adjacent cavity portions whereby the cavity portions are communicated with each other.

Figure 3:
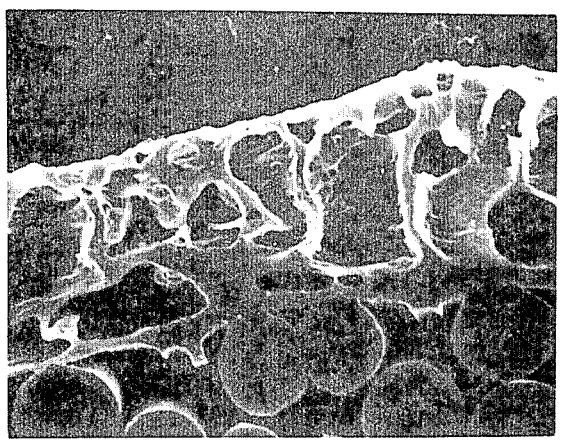
FIG. 3 is a microphotograph showing the section of coated fabric which served as the base of the layer shown in FIG. 1.
Figure 4:
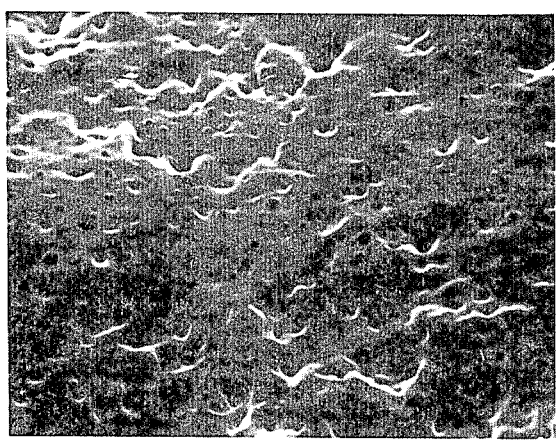
FIG. 4 is a microphotograph of the coated surface of the coated fabric made according to this invention.

Such communication holes have a diameter not larger than 5 microns, usually about 0.1 to about 3 microns. Conventional microporous layers are of a structure such that a large number of independent air bubbles are formed therein, or of a structure such that tubular holes exist in large numbers which communicate between the surface and the back; besides, their diameters are mostly not smaller than 10 microns, so that the resulting coated fabric is inferior in moisture- and air permeability or inferior in water-proofness. On the other hand, the one formed according to this invention is a new microporous layer comprising the combination of very fine pores of not larger than 5 microns in diameter and relatively large cavity portions, so that it is possible to obtain a coated fabric superior in water resistance, drapeness, peeling strength and also superior in moisture- and air permeability, water-proofness (FIGS. 3 and 4). Since the microporous layer formed according to this invention has such a characteristic feature as mentioned above, it can exhibit superior functions in point of water-proofness and moisture permeability. The fine pores formed in the surface of the microporous layer of the invention are existent in extremely large numbers. For example, as a result of checking such fine pores with respect to a certain limited portion, it was found that more than half a million pores were existent per square centimeter. In this invention, the microporous layer of the structure shown in FIG. 1 is existent at a fairly large probability throughout the resulting coated fabric.

Figure 2:
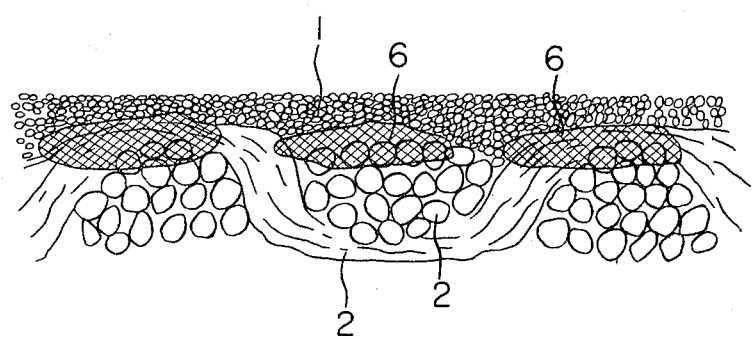
FIG. 2 is an enlarged sectional view showing an example of a fabric which has been subjected to a process for improving peeling strength and for imparting drapeness.

FIG. 2 is an enlarged sectional view showing an example of a fabric which has been subjected to a processing for improving peeling strength and for imparting drapeness, in which an adhesive polymer 6 is arranged in spaced, dotted form between the base fabric 2 and the microporous layer 1. The microporous layer 1 illustrated in FIG. 2 is of the same structure as the microporous layer shown in FIG. 1.

The moisture-permeable waterproof coated fabric of this invention has superior water-proofness and moisture permeability and a moderate air permeability and further durability without spoilage of its handling, and these characteristics permit it to be used in a wide variety of applications, including sports wears such as golf wear, jackets, wind breaker and ski wear, cold-proof clothes, rain wears, work clothes, tents, canvas shoes and diaper covers.

Examples

Working examples of this invention are given below to further illustrate the invention. All the parts shown in the examples are by weight.

EXAMPLE 1

15 parts of a polyester type polyurethane elastomer, 5 parts of a fluorine-based repellent agent, 0.8 part of a trimethylolpropane-hexamethylene diisocyanate adduct and 5 parts of a polypropylene glycol-polyethylene glycol block copolymer (a nonionic surfactant) were dissolved in 74.2 parts of dimethylformamide to prepare a coating solution. The coating solution thus prepared was applied onto a pre-softened nylon taffeta in an amount of about 300 g/m² by means of a reverse roll coater. Immediately thereafter, the nylon taffeta was conducted into an aqueous solution 10% by weight of dimethylformamide and immersed therein for 5 minutes at 20° C. to allow gelation to take place, then washed with hot water at 80° C. for 30 minutes and, after hot air drying at 120° C., it was heat-treated at 140° C., whereby a coated fabric of drape handling was obtained.

The coated fabric was immersed in a silicone emulsion at a concentration of 3% by weight, then squeezed by a mangle uniformly at a squeeze ratio of 50% and thereafter heat-treated at 150° C. for 30 seconds by a conventional heat setter.

The resulting product possessed superior water-proofness and moisture permeability, having a water entry pressure of 1600 mmH$_2$O/cm$^2$, a water repellency of 100 and a moisture-vapor transmission of 2500 g/m$^2$.24 hrs, and its resistance to washing and to dry cleaning was good, so it was suitable for such uses as skiing anorak and rain wears.

On the other hand, using as a coating solution a dimethylformamide solution containing 15% by weight of a polyester type polyurethane elastomer, a base fabric was subjected to application of the coating solution, wet coagulation, hot water washing and drying in the same manner as in Example 1 to give a coated fabric. The coated fabric was immersed in an aqueous dispersion containing 5% by weight of a fluorine-based water repellent agent, then squeezed by a mangle at a squeeze ratio of 50% and thereafter heat-treated at 150° C. for 30 seconds by a heat setter. The resulting product was inferior in drapeness to the foregoing product obtained according to the method of this invention. Also in physical properties it was insufficient in point of water-proofness (particularly water entry pressure) and moisture permeability, having a water entry pressure of 210 mmH$_2$O/cm$^2$, a water repellency of 90 to 100 and a moisture-vapor transmission of 1300 g/m$^2$.24 hrs. Thus, the use thereof as a waterproof clothing was inappropriate.

(Note)

The physical properties were measured according to the following methods:

Water entry pressure: JIS L-1079,
Water repellency: JIS L-1079,
Moisture-vapor transmission: JIS Z-0208.

EXAMPLE 2

20 parts of a polyester type polyurethane elastomer, 4 parts each of fluorine- and silicone-based water repellent agents, 2 parts of isophorone diisocyanate and 4 parts of a polypropylene glycol-polyethylene glycol block copolymer were dissolved in 66 parts of dimethylformamide to prepare a coating solution.

The coating solution thus prepared was applied onto a polyester twill fabric in an amount of about 200 g/m$^2$ by means of a knife-over-roll coater, then conducted into an aqueous dimethylformamide solution at a concentration of 5% by weight and immersed therein for 5 minutes at 30° C. to allow gelation to take place and, after hot air drying at 120° C., it was heat-treated at 140° C. for 5 minutes.

The resulting coated fabric possessed a moderate drapeness and superior water-proofness and moisture permeability, having a water entry pressure of 2000 mmH$_2$O/cm$^2$, a water repellency of 100 and a moisture-vapor transmission of 2500 g/m$^2$.24 hrs. These physical properties were little deteriorated even after washing five times in accordance with JIS L-0844 (A-2). Thus, this coated fabric was suitable for various waterproof clothes.

On the other hand, using the same recipe as that in Example 2 except that two parts of isophorone diisocyanate was not used, a base fabric was treated in the same manner as in Example 2 to give a drape coated fabric. This coated fabric possessed about the same physical properties as those of the coated fabric obtained in Example 2, but on washing its waterproofness deteriorated to a remarkable extent; water entry pressure 500 mmH$_2$O/cm$^2$, water repellency 50. Thus, this coated fabric was unsuitable for practical use.

EXAMPLE 3

A nylon woven fabric having stretchability was immersed in 100 parts of an aqueous dispersion containing 3 parts of a fluorine-based water repellent agent, then squeezed by a mangle at a squeeze ratio of 40% and thereafter heat-treated at 150° C. for 30 seconds by a heat setter.

Separately, a coating solution was prepared by dissolving 15 parts of a polyether type polyurethane elastomer, 5 parts of a fluorine-based water repellent agent, 2 parts of a trimethylolpropanehexamethylene diisocyanate adduct and 2 parts of a nonionic surfactant, in 76 parts of dimethylformamide. The coating solution thus prepared was applied onto the above base fabric subjected to the water repellent treatment in an amount of about 70 g/m$^2$ using the gravure printing method. Immediately thereafter, the base fabric was conducted into water and immersed therein for 5 minutes to allow gelation to take place, then dried with hot air at 120° C. and thereafter heat-treated at 140° C. for 5 minutes.

The resulting coated fabric was very soft and drape, possessing superior moisture permeability and water-proofness; water entry pressure 800 mmH$_2$O/cm$^2$, water repellency 100, moisture-vapor transmission 3800 g/m$^2$·24 hrs. Besides, these physical properties were resistant to washing with little deterioration recognized even after washing five times. Thus, this coated fabric was suitable for sports wears.

EXAMPLE 4

A fabric made of a blended polyester-cotton spun yarn was treated with a solution of a fluorine-based water repellent agent, then dried and heat-treated. The amount of the water repellent agent adhered to the fabric was 0.04% by weight.

Separately, a coating solution (viscosity 900 cps at 30° C.) was prepared by dissolving 15 parts of a polyester type polyurethane elastomer, 0.4 part of a fluorine-based water repellent agent, 1.0 part of a trimethylolpropane-hexamethylene diisocyanate (molar ratio 1:3) adduct and 5 parts of a polypropylene glycol-polyethylene glycol block copolymer (a nonionic surfactant), in 78.6 parts of dimethylformamide. The coating solution thus prepared was applied onto the above base fabric subjected to the water repellent treatment in an amount of about 300 g/m$^2$ (wet) using a reverse roll coater. Then, the base fabric was immersed in an aqueous solution containing 10% by weight of dimethylformamide at 30° C. for 5 minutes to allow gelation to take place, washed with hot water at 80° C. for 30 minutes, dried with hot air and thereafter heat-treated at 140° C. for 3 minutes.

The resulting coated fabric was immersed in a solution containing 1% by weight of a fluorine-based water repellent agent, then squeezed by a mangle uniformly at a squeeze ratio of 70% and thereafter heat-treated at 150° C. for 30 seconds using a heat setter.

The product thus obtained, with the polyurethane coating solution little impregnated in the interior of the base fabric, possessed superior water-proofness and moisture permeability; water entry pressure 1600 mmH$_2$O/cm$^2$, moisture-vapor transmission 5500 g/m$^2$·24 hrs, air permeability 90 sec/100 cc, peeling strength 400 g/cm, crease-flex-resistance 5000 times/1 kg load. Besides, its resistance to washing was very high with little change recognized in physical properties even after washing five times. Coupled with a drape handling, this product was suitable for such uses as skiing anorak and other sports wears and rain wears.

Separately, after treating the fabric with the fluorine-based water repellent agent in the above Example 4, the fabric was further impregnated with 70% by weight of a mixed dimethylformamide/water (30/70) solution and then treated in the same as in Example 4 to give a coated fabric of drape handling. The peeling strength 700 g/cm of this product is a further improvement from that of the product obtained in Example 4, the other physical properties being the same as those attained in Example 4. The product was a coated fabric having both moisture permeability and water-proofness superior in durability. It was suitable for such applications as tents and other materials in addition to sports and rain wears.

On the other hand, a coated fabric was obtained in the same manner as in Example 4 except that the base fabric was not treated with the fluorine-based water repellent agent and as a coating solution there was used a dimethylformamide solution containing 15% by weight of only the polyester type polyurethane elastomer used in Example 4. In this coated fabric, the polyurethane coating solution permeated the interior of the base fabric with a portion thereof permeated as far as the opposite face to the applied face, and consequently the handling of this coated fabric became coarse and hard as compared with the product obtained in Example 4 according to the method of this invention. Also in physical properties, which were water entry pressure 1800 mmH$_2$O/cm$^2$, moisture-vapor transmission 700 g/m$^2$·24 hrs, air permeability 700 sec/100 cc and crease-flex-resistance 1000 to 2000 times/1 kg load, this product was inferior in air and moisture permeability and in resistance-to-flex-cracking, though it possessed water-proofness. Thus, this product was unsuitable for the clothing use.

(Note):
The physical properties were measured according to the following methods:
Water entry pressure: JIS L-1079 (ASTM D751),
Moisture-vapor transmission: JIS Z-0208 (ASTM E96-66),
Air permeability: JIS L-1006 (FED STD 5452),
Peeling strength: JIS K-6328 (ASTM D-751),
Crease-flex-resistance: JIS K-6328 (ASTM D-751),
Washing resistance: JIS L-0844 (A-2)(AATCC36-1969-Test 2).

EXAMPLE 5

A polyester twill fabric was immersed in an aqueous dispersion containing 2% by weight of a fluorine-based water repellent agent, then squeezed by a mangle uniformly at a squeeze ratio of 40% and thereafter heat treated at 150° C. for 30 seconds using a heat setter.

Separately, a coating solution (viscosity 1500 cps at 30° C.) was prepared by dissolving or dispersing 20 parts of a polyether type polyurethane elastomer, 0.8 part of a fluorine-based water repellent agent, 2 parts of isophorone diisocyanate, 4 parts of a polypropylene glycol-polyethylene glycol block copolymer and 5 parts of silica gel, in 68.2 parts of dimethylformamide. The coating solution thus prepared was applied onto the above base fabric subjected to the water repellent treatment in an amount of about 200 g/m² (wet) using a knife-over-roll coater. The base fabric was then conducted into an aqueous solution containing 5% by weight of dimethylformamide and immersed therein for 5 minutes at 30° C. to allow gelation to take place, dried with hot air at 120° C. and heat-treated at 140° C. for 5 minutes.

The resulting coated fabric, with little permeation of the polyurethane coating solution in the interior of the base fabric, possessed a drape handling and superior water-proofness and moisture permeability; water entry pressure 2000 mmH₂O/cm², moisture permeability 5100 g/m²·24 hrs. The peeling strength and the crease-flex-resistance were also high, 350 g/cm and 3000 times/1 kg load, respectively. These physical properties were little deteriorated even after washing five times. Thus, this product was suitable for various waterproof clothes. In the microporous layer were formed pores of 1 micron and cavity portions of 15 microns both on the average in diameter, with the cavity portions communicated with the surface pores through fine holes formed in the wall portions thereof.

EXAMPLE 6

A nylon taffeta fabric was treated with a fluorine-based water repellent agent. The amount of the water repellent agent adhered to the taffeta was 2% by weight.

20 parts of a polyester type polyurethane elastomer, 0.5 part by weight of fluorine-based water repellent agent, 2 parts of isophorone diisocyanate and 5 parts of a polypropylene glycol-polyethylene glycol block copolymer were dissolved in 72.5 parts of dimethylformamide to prepare a coating solution (viscosity 1600 cps at 30° C.). The coating solution thus prepared was applied onto the above taffeta subjected to the water repellent treatment in an amount of about 300 g/m² (wet) using a knife-over-roll coater.

A nylon half tricot fabric which had been treated with a fluorine-based water repellent agent (the amount of the water repellent agent adhered to the tricot being 0.05% by weight) was sticked in load- and tension-free state to the surface of the taffeta to which had been applied the foregoing polyurethane coating solution. Then, the sticked mass was immersed in an aqueous bath containing 10% by weight of dimethylformamide, was allowed to become gelled at 30° C. for 10 minutes, washed with hot water at 80° C. for 30 minutes, dried with hot air and thereafter the nylon taffeta was separated.

By applying the above-mentioned treatment, there was obtained a coated fabric with a microporous polyurethane layer formed on the surface of the nylon half tricot.

This coated fabric, with little permeation of the polyurethane coating solution in the interior of the base fabric, preserved the elasticity and drapeness of the tricot itself and possessed excellent physical properties superior in both water-proofness and moisture permeability; peeling strength 250 g/cm, water entry pressure 1500 mmH₂O/cm², moisture-vapor transmission 6000 g/m²·24 hrs, air permeability 3 sec/100 cc, crease-flex-resistance 5000 times or more/1 kg load. Furthermore, the microporous layer was of the structure as those obtained in Example 1 and illustrated in FIG. 1.

EXAMPLE 7

Onto a nylon taffeta (warp and weft of 70 denier nylon filament yarn, warp density × weft density = 123 × 87) was partially printed and applied to a toluen solution (viscosity 2000 cps at 20° C.) containing 15% by weight of an acrylic ester copolymer and 3% by weight of a trimethylolpropane-hexamethylene diisocyanate (molar ratio 1:3) adduct, by means of an engraved roller with multiple dots of 87 microns in depth and with a printing area of 50%, followed by drying and heat treatment. The amount of the said copolymer adhered to the base fabric was 10 g/m² (wet).

Onto the base fabric treated as above was further applied a dimethylformamide solution (viscosity 8000 cps at 20° C.) containing 20% by weight of polyurethane and 4% by weight of a pore controller in an amount of 150 g/m² (wet) by means of a knife-over-roll coater. Then, the base fabric was immersed in a water bath, allowed to coagulate, washed with water, dried and thereafter heat-treated at 150° C. for 10 minutes. The characteristics of the resulting moisture-permeable coated fabric are shown in Table 1.

By way of comparison, Table 1 also shows the characteristics of a coated fabric obtained according to this working example but to which was not applied at all the acrylic ester copolymer solution, and also the characteristics of a coated fabric obtained according to this working example but in which the said polymer solution was applied to the entire surface of the base fabric using the knife-over-roll coater.

TABLE 1

|  | Moisture-permeable coated fabric according to this invention | Comparative Example | Comparative Example |
| --- | --- | --- | --- |
| Application state and amount (g/m²) of acrylic ester copolymer | Applied in multiple dots form 10 (wet) | Not applied | Applied to the entire surface 50 (wet) |
| Permeation of polyurethane into base fabric (%/base fabric thickness) | 25 | A portion permeated the reverse side of base fabric | 0 But a portion of acrylic ester copolymer permeated the reverse side of base fabric |
| Moisture-vapor transmission (cc/m²·24 hrs) | 4100 | 2400 | 800 |
| Peeling strength (g/cm) | 400 | 90 | 600 |
| Handling | Very drape | A little | Coarse and hard |

TABLE 1-continued

| Moisture-permeable coated fabric according to this invention | Comparative Example | Comparative Example |
|---|---|---|
| inferior | | |

Note
Moisture-vapor transmission JIS Z-0208
Peeling strength- JIS K-6328

EXAMPLE 8

12 parts of a polyether type polyurethane elastomer, 1 part of a fluorine-based water repellent agent, 0.5 part of a trimethylolpropane-2,4-tolylene diisocyanate adduct, 1 part of a polypropylene glycol-polyethylene glycol block copolymer and 3 parts of a finely-powdered silica gel were dissolved and dispersed in 82.5 parts of dimethylformamide to prepare a coating solution.

The coating solution thus prepared was applied to a fabric made of a blended nylon-cotton spun yarn in an amount of about 150 g/m$^2$ using a knife-over-roll coater. The base fabric was conducted into a 10% by weight aqueous dimethylformamide solution and immersed therein for 5 minutes at 30° C. to allow gelation to take place, then dried with hot air at 120° C. and thereafter heat-treated at 140° C. for 5 minutes.

The coated fabric thus obtained was immersed in a solution of a fluorine-based water repellent agent at a concentration of 2% by weight, then squeezed by a mangle uniformly at a squeeze ratio of 50% and thereafter heat-treated at 150° C. for 30 seconds by a conventional heat setter.

The resulting product possessed superior waterproofness and moisture permeability, having a water entry pressure of 1400 mmH$_2$O/cm$^2$, a water repellency of 100 and a moisture-vapor transmission of 5100 g/m$^2$·24 hrs. Besides, these physical properties were little deteriorated even after washing five times. Thus, this product was suitable for various waterproof clothes.

EXAMPLE 9

A fabric made of a blended polyamide-cotton spun yarn was immersed in an aqueous dispersion containing 2% by weight of a fluorine-based water repellent agent, then squeezed by a mangle uniformly at a squeeze ratio of 40% and thereafter heat-treated at 150° C. for 30 seconds using a heat setter.

Separately, a coating solution (viscosity 1300 cps at 30° C.) was prepared by dissolving and dispersing 15 parts of a polyester type polyurethane elastomer, 1.0 part of a fluorine-based water repellent agent, 2 parts of a silicone-based water repellent agent, 1.0 part of a trimethylolpropanehexamethylene diisocyanate (molar ratio 1:3) adduct and 5 parts of a polypropylene glycol-polyethylene block copolymer, in 81 parts of dimethylformamide. The coating solution thus prepared was applied to the above base fabric subjected to the water repellent treatment in an amount of about 200 g/m$^2$ (wet) using a knife-over-roll coater. The base fabric was then conducted into an aqueous solution containing 10% by weight of dimethylformamide and immersed therein for 5 minutes at 30° C. to allow gelation to take place, dried with hot air at 120° C. and heat-treated at 140° C. for 5 minutes.

The coated fabric thus obtained was immersed in a solution containing 1% by weight of a fluorine-based water repellent agent, then squeezed by a mangle uniformly at a squeeze ratio of 50% and thereafter heat-treated at 150° C. for 30 seconds using a heat setter.

The resulting product, with little permeation of the polyurethane coating solution in the interior of the base fabric, possessed a drape texture and superior waterproofness and moisture permeability, having a water entry pressure of 2300 mmH$_2$O/cm$^2$ and a moisture-vapor transmission of 5400 g/m$^2$·24 hrs. Besides, the peeling strength and the crease-flex-resistance were high, 370 g/cm and more than 3000 times/1 kg load, respectively. These physical properties were little deteriorated even after washing five times. Thus, this product was suitable for various water-proof clothes. The section of this product is as shown in FIG. 1.

EXAMPLE 10

15 parts of a polyester type polyurethane elastomer, 8 parts of stearic acid chromic chloride and 5 parts of a pore controller were dissolved and dispersed in 72 parts of dimethylformamide to prepare a coating solution. The coating solution thus prepared was applied onto a pre-softened nylon taffeta in an amount of about 200 g/m$^2$ using a reverse roll coater. Immediately thereafter, the base fabric was conducted into a water bath containing 10% dimethylformamide and immersed therein for 5 minutes at 20° C. to allow gelation to take place, washed with hot water at 80° C. for 30 minutes, dried with hot air at 120° C. and then heat-treated at 140° C. for 5 minutes to form a microporous layer of drape texture on the surface of the base fabric.

The base fabric was then immersed in a 3% silicone emulsion, squeezed by a mangle uniformly at a squeeze ratio of 50% and thereafter heat-treated at 150° C. for 30 seconds using a conventional heat setter.

The resulting product possessed superior waterproofness and moisture permeability: water entry pressure 1600 mmH$_2$O, water repellency 100, moisture-vapor transmission 5300 g/m$^2$·24 hrs. Besides, its resistance to washing and to dry cleaning was good.

EXAMPLE 11

17 parts of a polyester type polyurethane elastomer, 5 parts of stearic acid alumic chloride, 3 parts of a silicone-based water repellent agent and 3 parts of an inorgaic filler were dissolved and dispersed in 72 parts of dimethylformamide to prepare a coating solution.

The coating solution thus prepared was applied onto a polyester twill fabric in an amount of about 150 g/m$^2$ using a knife-over-roll coater. The base fabric was conducted into a 10% aqueous dimethylformamide solution and immersed therein for 5 minutes at 30° C., thereafter dried with hot air at 120° C. and heat-treated at 140° C. for 5 minutes to form a microporous layer of drape handling on the surface of the base fabric.

The base fabric was then immersed in a 5% aqueous dispersion of a fluorine-based water repellent agent, thereafter squeezed by a mangle uniformly at a squeeze ratio of 50% and heat-treated at 150° C. for 30 seconds using a heat setter.

The resulting product possessed superior waterproofness and moisture permeability: water entry pressure 2200 mmH$_2$O/cm$^2$, water repellency 100, moisture-vapor transmission 5100 g/m$^2$·24 hrs. Besides, these physical properties were little deteriorated even after washing five times according to the instructions defined by JIS L-0844 (A-2).

In the above Examples, "crease-flex-resistance" means the number of rubbing when the coated fabric was rubbed at 1 kg load by means of Scott Type Folding and Abrading Tester until the surface of the fabric could be cracked. The fluorine-based repellent agent used together with polyurethane elastomer is "Scotchguard FC-453" (a product of 3M) and the fluorine-based repellent agent used for pre- or after-treatment is "Asahiguard AG-710" (a product of Meisei Chemical Co.). The polyester type polyurethane elastomer used is a linear polyurethane obtained by addition-polymerization of polyester having terminal hydroxy groups of m.w. 2,000, which was obtained by condensation reaction of adipic acid and ethylene glycol, diphenylmethane-4,4'-diisocyanate and a dihydroxy compound such as ethylene glycol. The polyether type polyurethane elastomer used is a linear polyurethane obtained by addition-polymerization of polyether having terminal hydroxyl groups of m.w. 2,500, which was obtained by ring-opening-polymerization of tetrahydrofuran, diphenylmethane-4,4'-diisocyanate and hydrazine. In the examples, the silicone-based repellent agent used together with polyurethane elastomer is "Toray Silicone SD8,000" (a product of Toray Silicone Company, Limited) and the silicone-based repellent agent used for pre- or after-treatment is "Toray Silicone BY-16-805" (A product of Toray Silicone Company, Limited).

We claim:

1. A moisture-permeable water-proof fabric comprising a base fabric and a microporous layer formed on at least one face of said base fabric, characterized by having a water entry pressure not lower than 700 mmH$_2$O/cm$^2$ and a moisture-vapor transmission not lower than 2500 g/m$^2$·24 hrs., said microporous layer being formed by wet coagulation using a polar organic coating solution containing (a) from about 8 to about 25 percent by weight of polyurethane elastomer, (b) from about 0.1 to about 10 percent by weight of a water repellent agent, (c) from about 0.2 to about 3 percent by weight of polyisocyanate and (d) from about 1 to about 8 percent by weight of a nonionic surfactant.

2. The moisture-permeable waterproof coated fabric as defined in claim 1 characterized by having a water repellency not lower than 100.

3. The moisture-permeable waterproof coated fabric as defined in claim 1 characterized by having an air permeability not higher than 600 sec/100 cc.

4. The moisture-permeable waterproof coated fabric as defind in claim 1, in which the impregnation of said microporous layer into said base fabric is not more than one-third of the thickness of said base fabric, and the peeling strength of said microporous layer is not lower than 100 g/cm.

5. The moisture-permeable waterproof coated fabric as defined in claim 1, in which said microporous layer has a crease-flex-resistance not less than 2000 times/1 kg load.

6. The moisture-permeable waterproof coated fabric as defined in claim 1, in which between said microporous layer and said base fabric is interposed intermittently a synthetic polymer of a different composition from that of the polyurethane which forms said microporous layer.

7. Method of making a coated fabric having both waterproofness and moisture permeability characterized in that, in forming a microporous polyurethane layer by applying a polar organic solvent solution of a polyurethane elastomer to a base fabric, then immersing the base fabric in a coagulating bath to allow gelation to take place, followed by water-washing and drying, there is used as the coating solution a polar organic solvent solution containing (a) from 8 to 25% by weight of a polyurethane elastomer, (b) from 0.2 to 3% by weight of a polyisocyanate, (c) from 0.1 to 10% by weight of a water repellant agent which with respect to polyisocyanate (b), is stable at a temperature not higher than 40° C. and can react at a temperature not lower than 100° C., and (d) from 1 to 8% by weight of a nonionic surfactant, whereby a large number of said fine pores are adjusted to 5 microns or less in diameter.

8. The method of making a coated fabric as defined in claim 7, in which, before applying said coating solution, the base fabric is pre-treated so that the impregnation of said coating solution into the base fabric will be not more than one-third of the thickness of the base fabric.

9. The method of making a coated fabric as defined in claim 7, in which a water repellent treatment stop is added after the wet coagulation step for the coating solution.

10. The method of making a coated fabric as defined in claim 7, in which a synthetic polymer of a different composition from the synthetic polymer contained in said coating solution is let adhere non-uniformly to the base fabric before applying said coating solution.

11. The method of making a coated fabric as defined in claim 7, in which said water repellent agent is a silicone-based water repellent agent.

12. The method of making a coated fabric as defined in claim 7, in which said water repellent agent is a fluorine-based water repellent agent.

* * * * *

UNITED STATES PATENT AND TRADEMARK OFFICE
CERTIFICATE OF CORRECTION

PATENT NO. : 4,429,000
DATED : January 31, 1984
INVENTOR(S) : Yasushi Naka, et al.

It is certified that error appears in the above-identified patent and that said Letters Patent are hereby corrected as shown below:

At column 6, line 38, between microporous and layer, please insert --polyurethane--.

At column 7, line 14, please delete "ther" and insert therefore --there--.

At column 9, line 64, between solution and 10%, please insert --containing--.

Signed and Sealed this

Eleventh Day of June 1985

[SEAL]

Attest:

DONALD J. QUIGG

Attesting Officer     Acting Commissioner of Patents and Trademarks